No. 711,894. Patented Oct. 21, 1902.
H. P. HILL.
TIRE TIGHTENER.
(Application filed Apr. 22, 1902.)
(No Model.)

Witnesses
R. A. Boswell
C. M. Havell

Inventor
Harland P. Hill,
By H. C. Evert &co.
Attorneys

THE NORRIS PETERS CO., PHOTO-LITHO., WASHINGTON, D. C.

UNITED STATES PATENT OFFICE.

HARLAND P. HILL, OF HUMMER, KANSAS.

TIRE-TIGHTENER.

SPECIFICATION forming part of Letters Patent No. 711,894, dated October 21, 1902.

Application filed April 22, 1902. Serial No. 104,151. (No model.)

*To all whom it may concern:*

Be it known that I, HARLAND P. HILL, a citizen of the United States of America, residing at Hummer, in the county of Smith and State of Kansas, have invented certain new and useful Improvements in Tire-Tighteners, of which the following is a specification, reference being had therein to the accompanying drawings.

This invention relates to certain new and useful improvements in tire-tighteners, and has for its main object the provision of novel and effective means whereby the tire on a wheel may be tightened when required without the removal of the tire from the wheel, the shrinking of the tire, and replacing thereof on the wheel, as is generally the practice.

Briefly described, the invention consists in inserting a felly-section in the felly of the wheel, this inserted section being in two parts and each having a nut embedded in their mutually-adjacent ends. A tightener comprising a right and left hand threaded bolt is engaged with these two nuts, the bolt having a square, octagonal, or other suitably-shaped nut by means of which and a suitable wrench the tightener may be operated to spread the two parts of the inserted section of the felly, so as to tighten against the tire. These two parts of the felly-section are inclosed within a suitable cap or casing, which is slotted to receive bolts passing through the sections, and the cap or casing carries an interior clamp or grip adapted to engage the nut on the tightening-bolt and lock the latter in the position to which it has been adjusted. This construction, described above, embodies a form of my invention which I have shown in the accompanying drawings, and in describing the invention in detail reference will be had to these drawings, and like numerals of reference herein will indicate like parts thereon.

Figure 1:
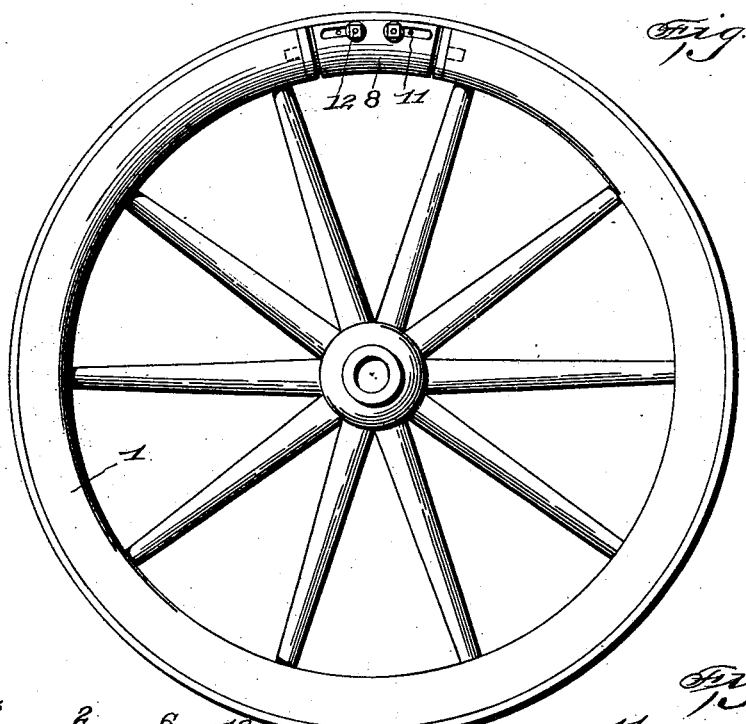
Figure 2:
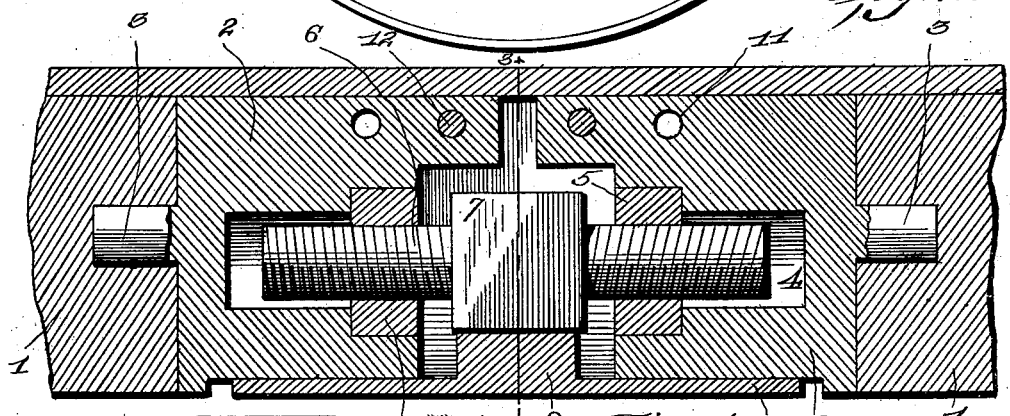
Figures 4, 5:
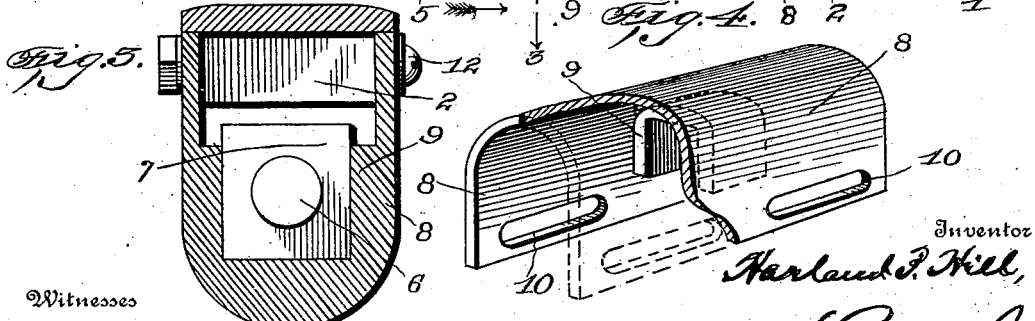

In the drawings, Figure 1 is a side view of a wheel with my improved tire-tightener applied in position. Fig. 2 is a longitudinal sectional view of a part of the felly and tire, showing the device in position. Fig. 3 is a transverse vertical sectional view taken on the line 3 3 of Fig. 2 looking in the direction of the arrow. Fig. 4 is a detail perspective view of the cap or casing, partially broken away.

My invention besides being applicable to new wheels constructed in accordance with my invention is alike applicable to old wheels, and to put the same into practice I cut away the major portion of the felly 1 between two adjacent spokes of the wheel. In this cut-away portion I mount my improved tire-tightener, which takes the place of the portion of the felly cut away and acts to complete the felly again. The device consists of two sections 2, each of which have pins 3 on their ends to engage in the holes provided therefor in the ends of the felly 1. These two sections 2 are recessed in their mutually-adjacent ends and are also provided with a counterbore 4, into which the tightening-bolt extends. A nut 5 is mounted in the adjacent ends of the sections 2, these two nuts being arranged to receive one the right-hand-threaded end of the bolt 5 and the other the left-hand-threaded portion of said bolt. This bolt is provided centrally of its length with an integral nut 7, which may be of square, octagonal, or other suitable shape, so as to be readily turnable by means of a wrench. The recessed adjacent ends of the sections permit the latter to move toward each other when the bolt is turned so as to cause this movement. The two sections 2, forming a part of the complete felly, are chamfered or reduced in thickness and have mounted thereon a cap or casing 8, the outer face of which will come flush with the sides of the felly 1. This cap or casing 8 is provided with an interior integral clamp or grip 9, which is adapted to fit over the nut 7 when the cap is in position, and thus hold the tightening-bolt in the position to which it has been adjusted. The cap or casing is provided in each side with slots 10, and through these slots and through apertures 11 in the sections 2 are passed bolts 12, which serve to bind the cap or casing firmly in position on the sections 2. The bolts are held by suitable nuts or other means, as desired.

When the tire is to be tightened, the cap or casing is removed, which may be readily accomplished by removing the bolts 12, and the bolt 6 is then turned by engagement of a wrench with the nut 7. The turning of this bolt in the proper direction serves to spread the sections 2 of the felly, and thus force the felly against the tire to tighten the latter. A number of the holes 11 are provided, so that the bolts may be positioned as may be desired, according to the adjustment made to the felly, and by reason of the oblong slots 10 in the cap or casing these bolts will readily pass through the said cap or casing at any desired point.

It will be observed that with this construction the tire may be quickly and effectively tightened when it becomes loose, and while the construction as herein shown and described in detail embodies a preferable form of my invention, yet I do not wish to limit myself to this exact construction, as various changes may be made without departing from the general spirit of the invention.

Having fully described my invention, what I claim as new, and desire to secure by Letters Patent, is—

In a tire-tightener, the combination with the felly, of the two sections interposed between the ends of the felly, pins carried by the sections to engage in the ends of the felly, said sections being provided in their mutually-adjacent ends with a counterbore, and having transversely-extending bolt-holes near the rim, nuts countersunk in the adjacent ends of the sections, a right and left hand threaded adjusting-bolt engaging said nuts and having a centrally-arranged integral nut said sections having a chamfered outer face a slotted casing fitted in said chamfered face and inclosing the sections, a clamp carried by said casing to engage opposite sides of the nut on the adjusting-bolt, and bolts passing through the transverse bolt-holes in the casing and through the slots in the casing, substantially as shown and described.

In testimony whereof I affix my signature in the presence of two witnesses.

HARLAND P. HILL.

Witnesses:
W. H. DANENBARGER,
CHAS. S. UHL.